United States Patent
Romenesko et al.

(10) Patent No.: US 11,364,689 B2
(45) Date of Patent: Jun. 21, 2022

(54) METHOD OF FORMING A PACKAGE GUSSET

(71) Applicant: Barry-Wehmiller, Inc., Green Bay, WI (US)

(72) Inventors: Scott Romenesko, Green Bay, WI (US); Thomas McGrane, Suamico, WI (US)

(73) Assignee: Barry-Wehmiller, Inc., Green Bay, WI (US)

(*) Notice: Subject to any disclaimer, the term of this patent is extended or adjusted under 35 U.S.C. 154(b) by 49 days.

(21) Appl. No.: 16/377,526

(22) Filed: Apr. 8, 2019

(65) Prior Publication Data

US 2020/0316874 A1 Oct. 8, 2020

(51) Int. Cl.
| | | |
|---|---|---|
| *B29C 65/18* | (2006.01) | |
| *B29C 65/00* | (2006.01) | |
| *B65B 9/20* | (2012.01) | |
| *B31B 155/00* | (2017.01) | |
| *B29L 31/00* | (2006.01) | |

(52) U.S. Cl.
CPC .......... *B29C 66/1122* (2013.01); *B29C 65/18* (2013.01); *B29C 66/133* (2013.01); *B29C 66/4312* (2013.01); *B65B 9/2056* (2013.01); *B29C 66/346* (2013.01); *B29L 2031/7128* (2013.01); *B31B 2155/003* (2017.08)

(58) Field of Classification Search
CPC .............. B29C 66/1122; B29C 66/133; B29C 66/4312; B29C 66/346; B29C 65/18; B65B 9/2056; B29L 2031/7128
USPC ........................................................ 493/194
See application file for complete search history.

(56) References Cited

U.S. PATENT DOCUMENTS

| | | | | |
|---|---|---|---|---|
| 3,790,744 A | * | 2/1974 | Bowen | B23K 26/0006 219/121.69 |
| 6,024,220 A | * | 2/2000 | Smith | B29C 66/24244 206/219 |
| 2017/0057192 A1 | * | 3/2017 | Romenesko | B29C 66/73921 |

* cited by examiner

*Primary Examiner* — Chelsea E Stinson
*Assistant Examiner* — Mary C Hibbert-Copeland
(74) *Attorney, Agent, or Firm* — Wood, Phillips, Katz, Clark & Mortimer (57) ABSTRACT

The present invention is directed to a method of forming a bottom-gusseted package, wherein each package includes an inwardly-extending, pleat-like gusset at the bottom of the package. To permit heat-sealing formation of each package, the sleeve from which each gusset is formed comprises a lamination of two differing polymeric materials, a sealant layer and a non-sealant layer, so that only an exterior surface of each sleeve, at which the sealant layer is positioned, exhibits the desired heat-sealing characteristics. To facilitate package formation, the sleeves from which the bottom gussets are formed are maintained in a closed or sealed configuration during package formation by providing a heat-sealed bond at the edge of each sleeve. In one embodiment, portions of the non-sealant layer are vaporized to provide sealable surface regions of the sealant layer. In an alternative embodiment, a lamination of the sealant and non-sealant layers is formed such that the sealant layer extends laterally beyond the non-sealant layer, to thereby provide sealable surface regions of the sealant layer.

10 Claims, 10 Drawing Sheets

METHOD OF FORMING A PACKAGE GUSSET

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates generally to formation of gusseted packages from heat-sealable, polymeric film material, and more particularly to a method of making a package gusset from a folded sleeve having a bonded edge, to thereby facilitate formation of a bottom-gusseted package for use with an associated form, fill and sealing packaging apparatus.

BACKGROUND OF THE INVENTION

Packages formed from plastic, polymeric film material have found widespread application in the market place for convenient and efficient packaging of all manner of food and non-food products. Packages of this nature typically are formed by folding and sealing a web of polymeric material to form a package body having front and rear package panels, with the package panels joined to each other at margins thereof. Depending upon the method of formation, the front and rear package panels may be joined to each other either by folded portions of the package body, or at seals (typically heat seals) joining the package panels to each other.

Efficient packaging of all manner of products and articles can be effected through use of a so-called form, fill and seal apparatus, which is configured to permit end-to-end formation of packages attendant to filling each package with the desired contents. U.S. Pat. No. 4,909,017, hereby incorporated by reference, illustrates an apparatus of this nature, showing the manner in which packaging are intermittently formed and advanced attendant to filling of each of the packages.

For many applications it is desirable to form a gusseted package, that is, providing the package with inwardly-extended, pleat-like gussets at one or more margins of the package body. One type of package which can advantageously facilitate retail display is sometimes referred to as a "stand up" or bottom-gusseted package, that is, a package having an upwardly and inwardly extending gusset at the bottom of the package body. By virtue of the gusset provided at the bottom of the package, the package can be readily displayed in an upstanding or self-standing orientation for promoting efficient display for consumer selection from a store shelf or other display area.

US Patent Publications No. 2014/0161373, and No. 2014/0294326, both of which are hereby incorporated by reference, disclose a particularly efficient method for forming a bottom-gusseted package, by which technique a bottom gusset for each package is positioned transversely of a longitudinal axis of a web of material from which the package is formed. Notably, this formation method facilitates bottom gusset package formation in conjunction with a form, fill and seal apparatus to promote cost-effective and versatile use of bottom-gusseted, stand-up packages.

Experience has shown that attendant to package formation in accordance with the above-referenced patent publications, it can be desirable to provide an arrangement by which a sleeve from which each package gusset is formed is maintained in a generally closed or folded configuration during package formation and filling. In particular, each package gusset is formed from a web of material comprising a lamination, such as a co-extrusion, of two different polymeric materials which exhibit differing heat-sealing characteristics. Gusset formation is effected by folding and cutting the web of material to provide individual sleeves which form the bottom gusset of each respective package. To facilitate package formation, each sleeve, and ultimately each gusset, includes a non-heating surface at the interior of the gusset to permit the gusset to splay or open, while the exterior surface is subject to heat-sealing, thus facilitating package formation and filling such as in conjunction with a form, fill and seal apparatus.

The present invention is directed to a method of forming individual sleeves each having an exterior surface that can be heat-sealed for forming the bottom gusset of a package, while each sleeve is maintained in a closed configuration during package formation.

SUMMARY OF THE INVENTION

The present invention is directed to a method forming a bottom-gusseted package, wherein each package includes an inwardly-extending, pleat-like gusset at the bottom of the package. To permit heat-sealing formation of each package, the sleeve from which each gusset is formed comprises a lamination of two differing polymeric materials, so that only an exterior surface of each sleeve exhibits the desired heat-sealing characteristics at typical processing temperatures. Notably, in order to facilitate package formation, the sleeves from which the bottom gussets are formed are maintained in a closed or bonded configuration during package formation by providing a heat-sealed bond at the edge of each sleeve.

Ultimately, attendant to individual package filling and formation, each individual sleeve is cut to provide the desired bottom gusset for each package, with the remaining portion of each sleeve providing a top sleeve portion in an adjacent package. The heat-sealed bond which acts to maintain each sleeve in a closed condition during processing is positioned in the top sleeve portion of each package. Thus, the bonded edge of the sleeve is typically positioned such that the bonded edge of the sleeve is positioned at the top of an adjacent one of the packages. When the packages are cut and separated after filling, the bonded edge portion is cut from the remainder of the sleeve, so that the bottom gusset can open as intended. Depending upon the specific requirements of the package, the heat-sealed bond can be formed to be selectively openable to permit access to the contents of the package via the top sleeve portion.

In accordance with the present invention, a method of forming a tube of polymeric material comprises the steps of providing a web of polymeric material comprising a lamination of a non-sealant layer and a sealant layer having differing heat-sealing characteristics. Notably, the present method includes providing opposite lateral margins of the web with sealable surface regions of the sealant layer. These sealable surface regions can be formed by select removal of portions of the non-sealant layer, or by configuring the outer sealant layer to extend beyond opposite lateral margins of the inner, non-sealant layer.

The present method further includes folding the web of polymeric material to position the non-sealant layer at an inside surface thereof to form a folded web, and heat-sealing the folded web to form a tube. The heat-sealing step includes applying heat to the folded web to join the sealable surface regions of the sealant layer to provide a heat-sealed bond for the tube, without heat-sealing of the inner non-sealant layer to itself.

The present method further preferably includes cutting the tube from which the folded web is formed, after the heat-sealing step, to thereby trim a portion of folded web positioned laterally outwardly of the heat-sealed bond for the tube. This acts to eliminate excess material from the edge of the tube before it is used for formation of bottom-gusseted packages.

As noted, the present invention contemplates different techniques for providing the desired sealable surfaces of the sealant layer. In one technique, the step of providing opposite lateral margins of the web with sealable surface regions includes removing at least a portion the non-sealant layer at each of the opposite lateral margins of said web. In a current embodiment, this removing step includes vaporizing select portions of the non-sealant layer, which preferably includes applying laser-light energy to the lateral margins of the polymeric web.

Experience has shown that laser-light energy can be applied to the laminated web such that the non-sealant layer can be vaporized, without affecting the sealant layer, thus providing the desired sealable surface regions. It is within the purview of the present invention that the step of applying laser-light energy to the lateral margins of the polymeric web is effected after the step of folding the web. Notably, this formation technique includes directing the laser-light energy through the sealant layer to vaporize a double-thickness of non-sealant layer, thereby providing the sealable surface regions of the sealant layer. Alternatively, a pair of lasers can be provided for vaporizing the non-sealant layer at opposite lateral margins of the polymeric web, prior to folding of the web.

In an alternate technique, the step of providing opposite lateral margins of the web with sealable surface regions includes forming the lamination so that the sealant layer extends beyond the non-sealant layer at the opposite lateral margins of the web. Thus, the portions of the outer sealant layer that extend laterally beyond the inner non-sealant layer provide exposed surfaces that can be efficiently heat-sealed to form the desired heat-sealed bond for the tube formed from the folded web.

In the preferred practice, the laminated web from which the bonded tube is formed comprises a co-extrusion of the non-sealant and sealant layers. These layers are selected for their differing heat-sealing characteristics, such that the outer sealant layer is readily heat-sealable under typical processing conditions, while the inner non-sealant layer does not readily heat-seal to itself. In current practice, the outer sealant layer comprises heat-sealable polyethylene (PE), while inner non-sealant layer typically comprises polyethylene terephthalate (PET), which is selected for its barrier properties As noted, the present invention is particularly suited for use in making bottom-gusseted packages, which can be formed in conjunction with operation of an associated form, fill and seal apparatus, as known in the art. In accordance with this aspect of the present invention, the present method includes, providing a flexible web of material having a longitudinal axis, and cutting the bonded tube formed in accordance with the present invention into a plurality of individual sleeves. The individual sleeves are the joined to the flexible web in spaced apart relationship, longitudinally of the flexible web, with the spacing between the individual sleeves corresponding to the length of each of a plurality of bottom-gusseted packages being formed.

This aspect of the present invention next includes folding the flexible web of material, and joining the lateral margins thereof to form a folded flexible web, to thereby form a package body for each of the bottom-gusseted packages being formed. Each package body includes a front package panel and a rear package panel joined at opposite side margins thereof, with the individual sleeves being positioned generally within the folded flexible web.

Package formation is further effected by cutting the folded flexible web at intervals each corresponding in length to the length of each of the bottom-gusseted packages. The cutting step includes simultaneously cutting each of the individual sleeves positioned within the folded flexible web, so that each individual sleeve provides a bottom gusset for a respective one of the packages being formed. At the same time, this cutting step acts to form a top sleeve portion an adjacent one of the bottom-gusseted packages being formed. This top sleeve portion includes the heat-sealed bond which was formed to maintain the individual sleeves in a closed condition during package formation.

Other features and advantages of the present invention will be readily apparent from the following detailed description, the accompanying drawings, and the appended claims.

DETAILED DESCRIPTION OF THE PREFERRED EMBODIMENT

While the present invention is susceptible to embodiment in various forms, there is shown in the drawings and will hereinafter be described presently preferred embodiments, with the understanding that the present disclosure is to be considered an exemplification of the invention, and is not intended limit the invention to the specific embodiments illustrated.

The present invention is directed to a method forming a bottom-gusseted package, wherein each package includes an inwardly-extending, pleat-like gusset at the bottom of the package. To permit heat-sealing formation of each package, each gusset is formed from a lamination of two differing polymeric materials, so that only an exterior surface of each gusset exhibits the desired heat-sealing characteristics. Notably, in order to facilitate package formation, the sleeves from which the bottom gussets are formed are maintained in a closed or bonded configuration during package formation by the provision of a heat-sealed bond. Attendant to package formation, each individual sleeve is cut, with each bottom gusset thus formed being readily opened and spread apart attendant to package filling, so that each package can be self-standing. By cutting each individual sleeve, a top sleeve portion is formed in an adjacent package, with the heat-sealed bond being positioned in this top sleeve portion.

The present invention includes two improved methods of making a gusset material with a bond having improved strength. The first method preferably includes the use of a laser for forming a gusset material with an improved bond strength. In accordance with another aspect of the invention, the method utilizes two webs of different widths laminated to each other for forming a gusset material with improved bond strength. As will be further described, each method provides a heat-sealed bond for the polymeric web from which the bottom gussets are formed, thus facilitating package formation.

As will be appreciated, the problem solved by the improved methods of the present invention is achieving sufficient bonding strength when bonding two dissimilar webs or substrates together. The gusset material of the present invention utilizes two substrates that are laminated to each other, including one layer that "will not easily seal to itself", and the other layer that "will easily seal to itself", that is, utilizing sealing temperatures common to the industry for heat-sealing typical packaging materials utilizing typical packaging machinery operating at typical production speeds.

Since the inside of the folded gusset material is the side that does not readily seal to itself, it must be bonded together by some means other than a typical heat-sealing operation. US Patent Publication No. 2017/0057192, hereby incorporated by reference, contemplates melting the two substrates together, but experience has shown that this technique does not result in adequate bond strength, since the two different substrates have very different properties. The main cause of the problem is believed to result from the non-sealing substrate having a much higher melting temperature than the sealing layer substrate. The results of melting the two substrates together in a non-homogeneous mixture of the different materials forming the bond results in a bond with inadequate strength to facilitate package processing and formation. The melting of these materials together to form a bond not only produces poor bonding strength, but additionally, the bond strength is also very unpredictable, since the different materials used for these different substrates vary from one application to another.

Figure 1:
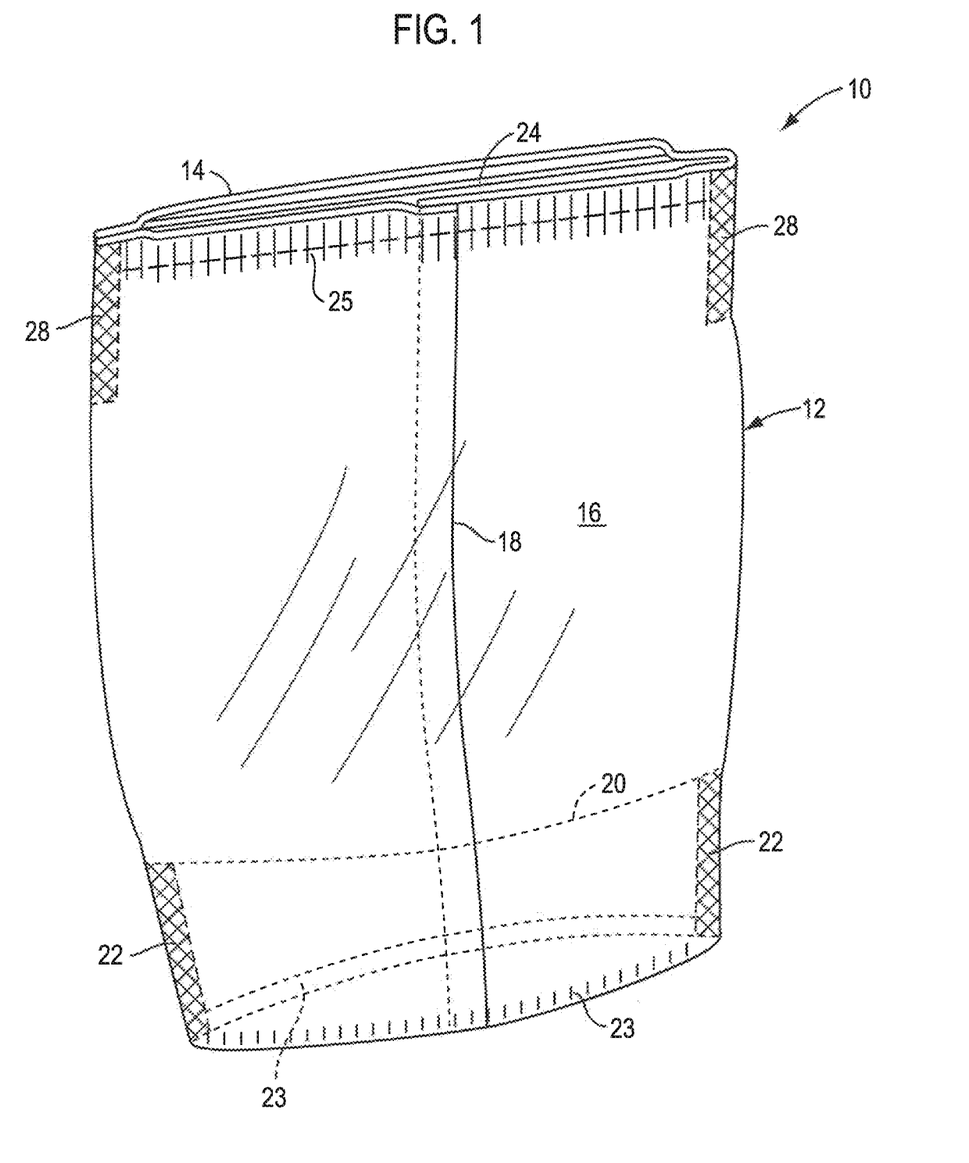
FIG. 1 is a perspective view of a bottom-gusseted package configured in accordance with the present invention.
Figure 2:
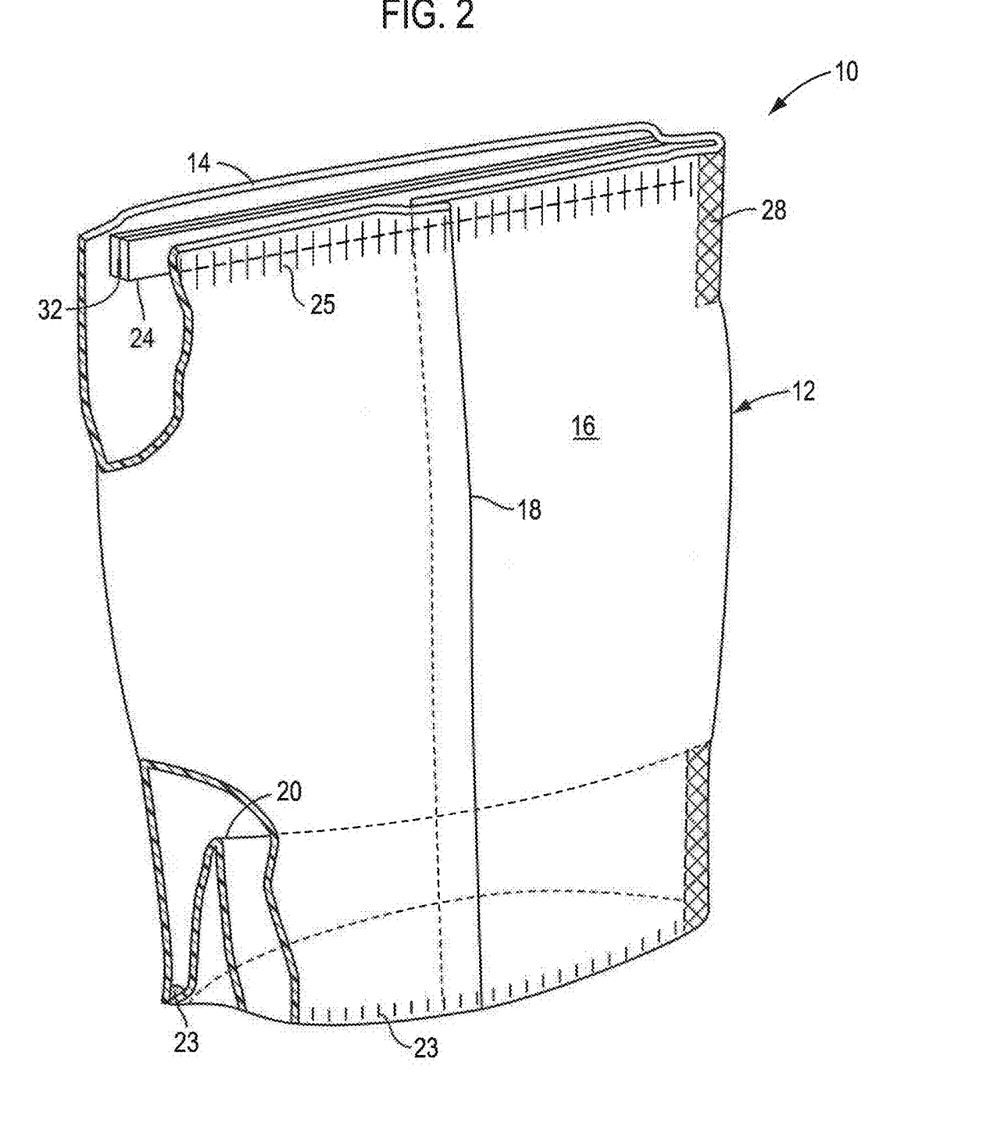
FIG. 2 is a perspective view, partially cut away, of the embodiment of the bottom-gusseted package shown in FIG. 1.

With reference first to FIGS. 1 and 2, therein is illustrated a bottom-gusseted package 10 embodying the principles of the present invention. As will be further described, bottom-gusseted package 10 is configured to facilitate formation and filling on an associated, so-called form, fill and seal packaging machine, as is known in the art. Typically, the present invention can be practiced by partial formation of the present package as a rolled web of flexible, polymeric film material, with individual sleeves positioned thereon, which is supplied to the form, fill and seal apparatus. The formation of each package is completed attendant to filling of each of the packages with the desired quantity of product.

Package 10 is formed by joining a plurality of individual sleeves to an associated web of flexible material, in spaced apart relationship along the longitudinal axis of the flexible web. Attendant to package formation, each individual sleeve can be cut as individual packages are formed, with each individual sleeve providing a bottom gusset 20. Package 10 includes a bottom gusset 20 which is positioned between the front and rear package panels 14 and 16, and which extends upwardly and inwardly from lower edges of the front and rear package panels. As will be further described, the pleat-like bottom gusset 20 is formed from a sleeve of material which is positioned within the flexible web from which the package body is formed, with the sleeve of material in cut attendant to formation of individual packages.

The bottom gusset 20 is joined to and integrated with the package body by a pair of side seals 22 at opposite lateral margins of the package body, and a pair of end seals 23 which respectively join the edges of the bottom gusset 20 to the front and rear package panels 14 and 16. The bottom gusset 20 can be configured to have a width less than that of the package 10, which permits the formation of side seals to join the front and rear package panels to each other. This permits the formation of a stable and self-standing package, by closing the opposite ends of the bottom gusset. This can be desirable since the inwardly facing surfaces of the bottom gusset ordinarily do not heat-seal to each other.

The package 10 includes a top sleeve portion 24 positioned between the front and rear package panels 14 and 16, at the upper end of the package body 12. The top sleeve portion 24 is joined to and integrated with the package body 12 by side seals 28 joining respective opposite ends of the sleeve portion 24 to the package body generally at opposite, lateral side margins thereof. A pair of top seals 25 respectively join the pair of legs or flanges of the top sleeve portion 24 to the front and rear package panels 14, 16. As will be further described, the top sleeve portion 24 is formed attendant to package formation and filling, as the packages are cut and separated. This cutting acts to simultaneously cut the sleeve within the package body which forms bottom gusset, so that the cut portion provides the top sleeve portion 24 in an adjacent one of the packages.

Depending upon the strength of the heat-sealed bond which is formed to maintain the gusset material in a closed configuration during processing, access to the contents of package 10 can be made via the top sleeve portion 24 by separation of the heat-sealed bond. Other arrangements can be provided for accessing the package contents, or the package may be cut open such a with scissors or the like.

Figure 5:
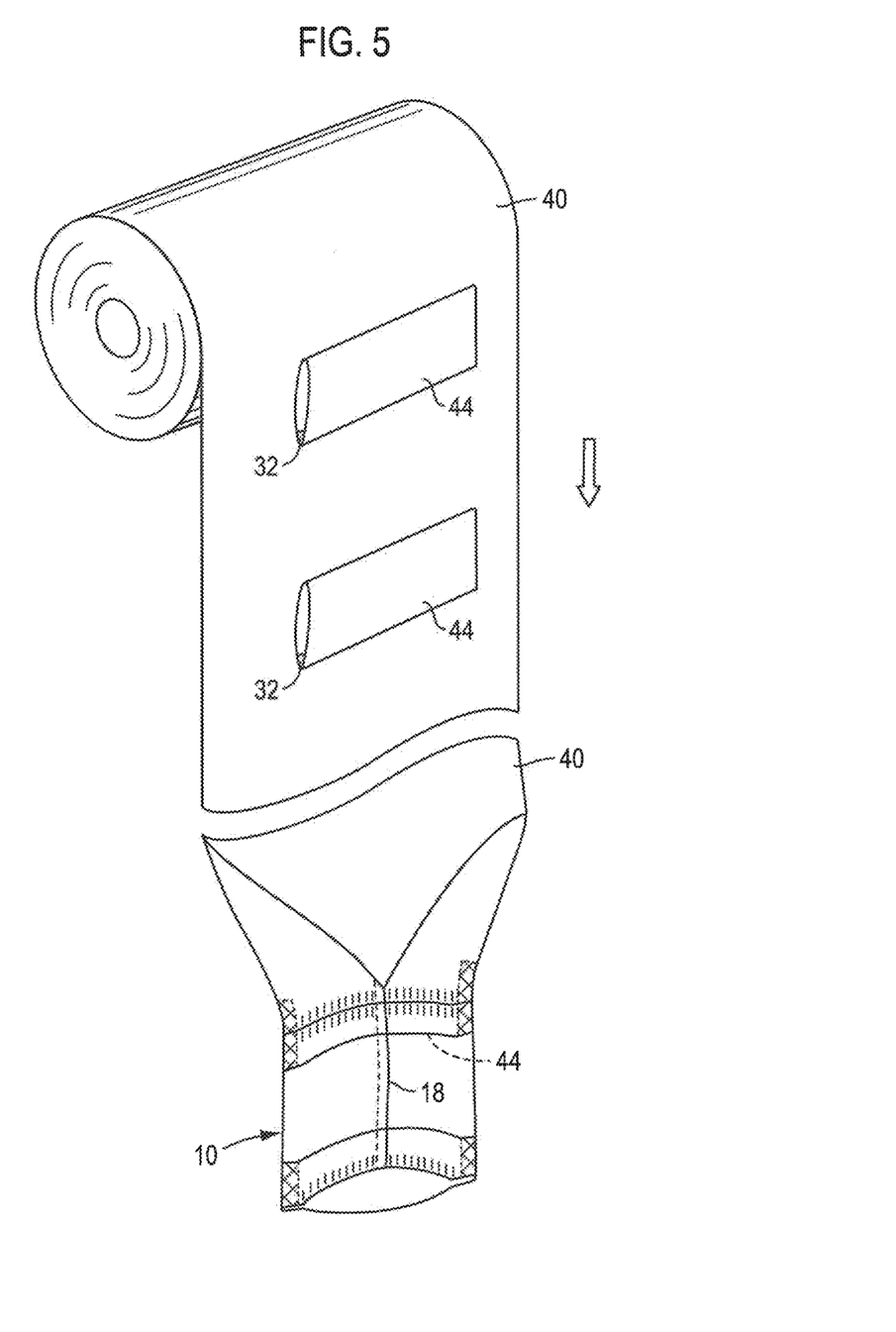
FIG. 5 is a diagrammatic view further illustrating formation of a recloseable, bottom-gusseted package.
Figure 6:
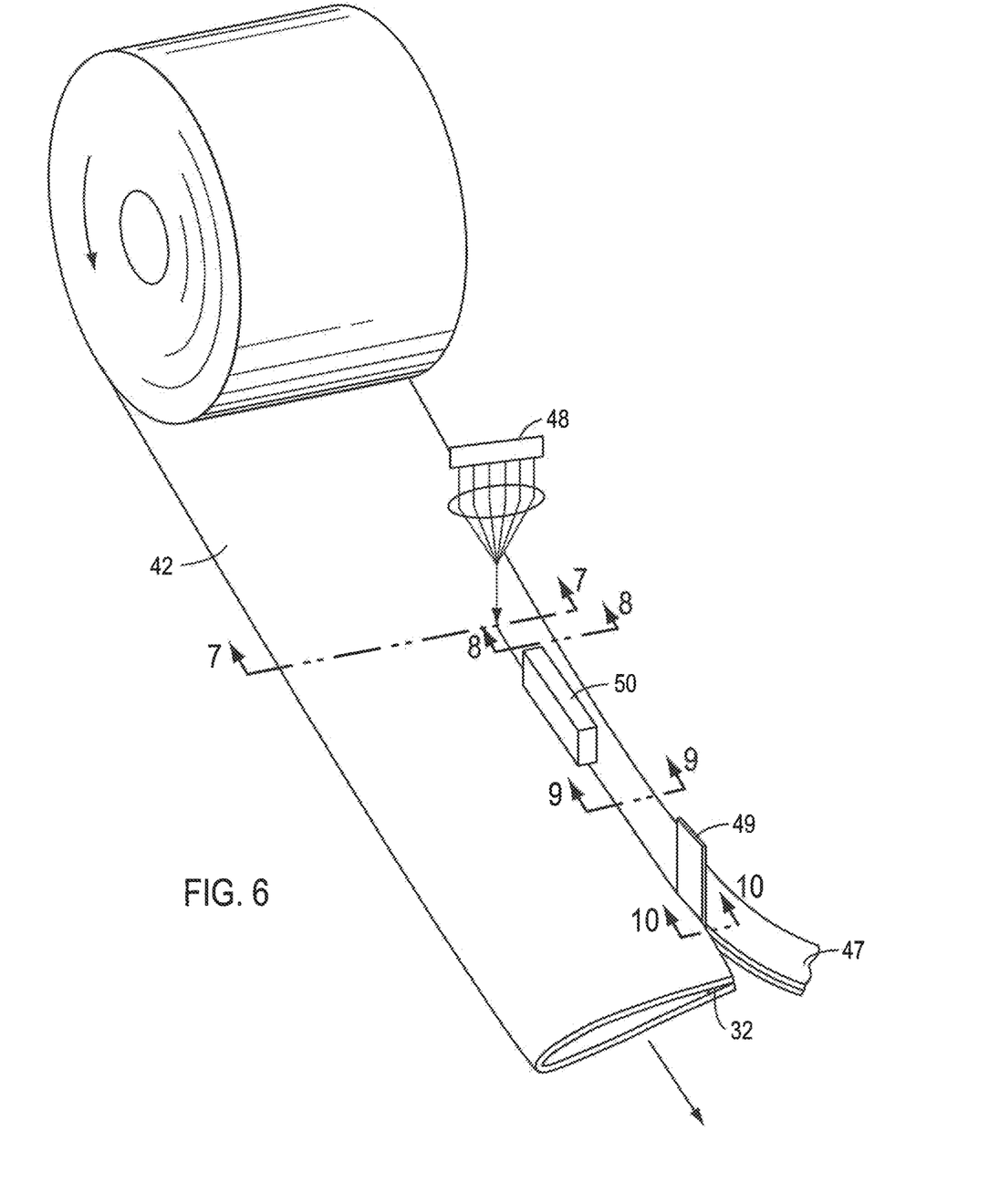
FIG. 6 is diagrammatic view of a method of making a tubular sleeve in accordance with the present invention.
Figure 7:
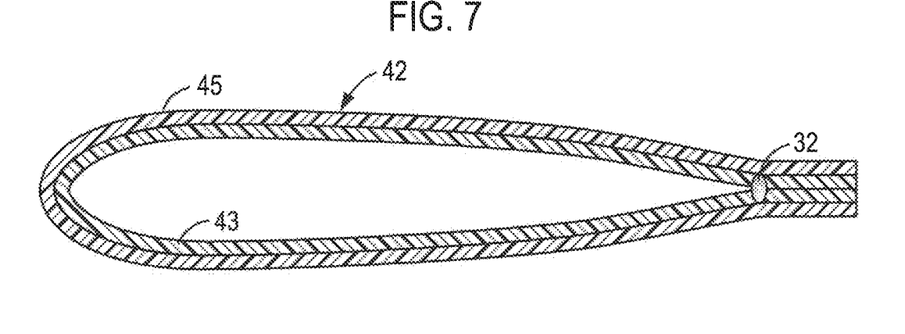
FIG. 7 is a cross-sectional view taken generally along lines 7-7 of FIG. 6.
Figure 8:
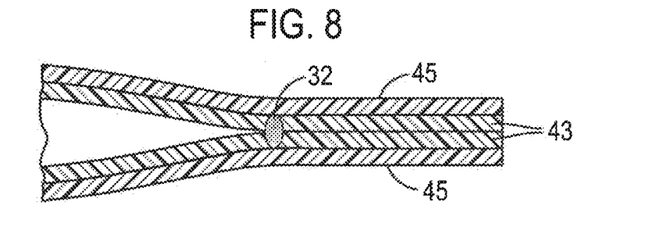
FIG. 8 is a cross-sectional view taken generally along lines 8-8 of FIG. 6.
Figure 9:
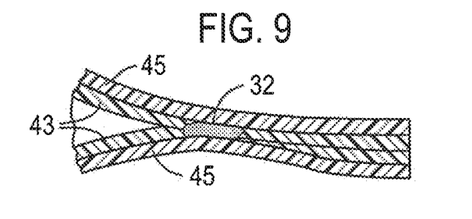
FIG. 9 is a cross-sectional view taken generally along lines 9-9 of FIG. 6.
Figure 10:
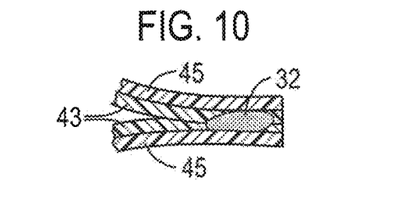
FIG. 10 is a cross-sectional view taken generally along lines 10-10 of FIG. 6.

As shown in FIGS. 5 and 6, for package formation, a flexible web 40 preferably comprising heat-sealable polymeric material is provided, with the flexible web typically advanced in a direction along its longitudinal axis. Formation of the present bottom-gusseted package is further effected by providing a flexible, sleeve-forming web 42, also preferably comprising suitable polymeric, heat-sealable material. The composition of the sleeve-forming web can differ from the flexible web 40 for forming the package of the body, as may be desired. In accordance with the present invention, the sleeve-forming web comprises a web of polymeric material comprising a non-sealant, barrier layer and a sealant layer having differing heat-sealing characteristics.

It is presently contemplated that only one side of the sleeve-forming web exhibit heat-sealing characteristics so that it can heat-sealed to the flexible web 40. In contrast, the other side of the sleeve-forming may be non-heat-sealable, or exhibit heat-sealing characteristics that otherwise differ from the heat-sealing characteristics of the first side. It is thus contemplated that the inside surface of the folded, sleeve-forming web does not heat seal to itself. This permits the eventual opening and spreading of the legs of the bottom gusset 20 so that the package 10 can assume a generally self-standing orientation.

Figures 3, 4:
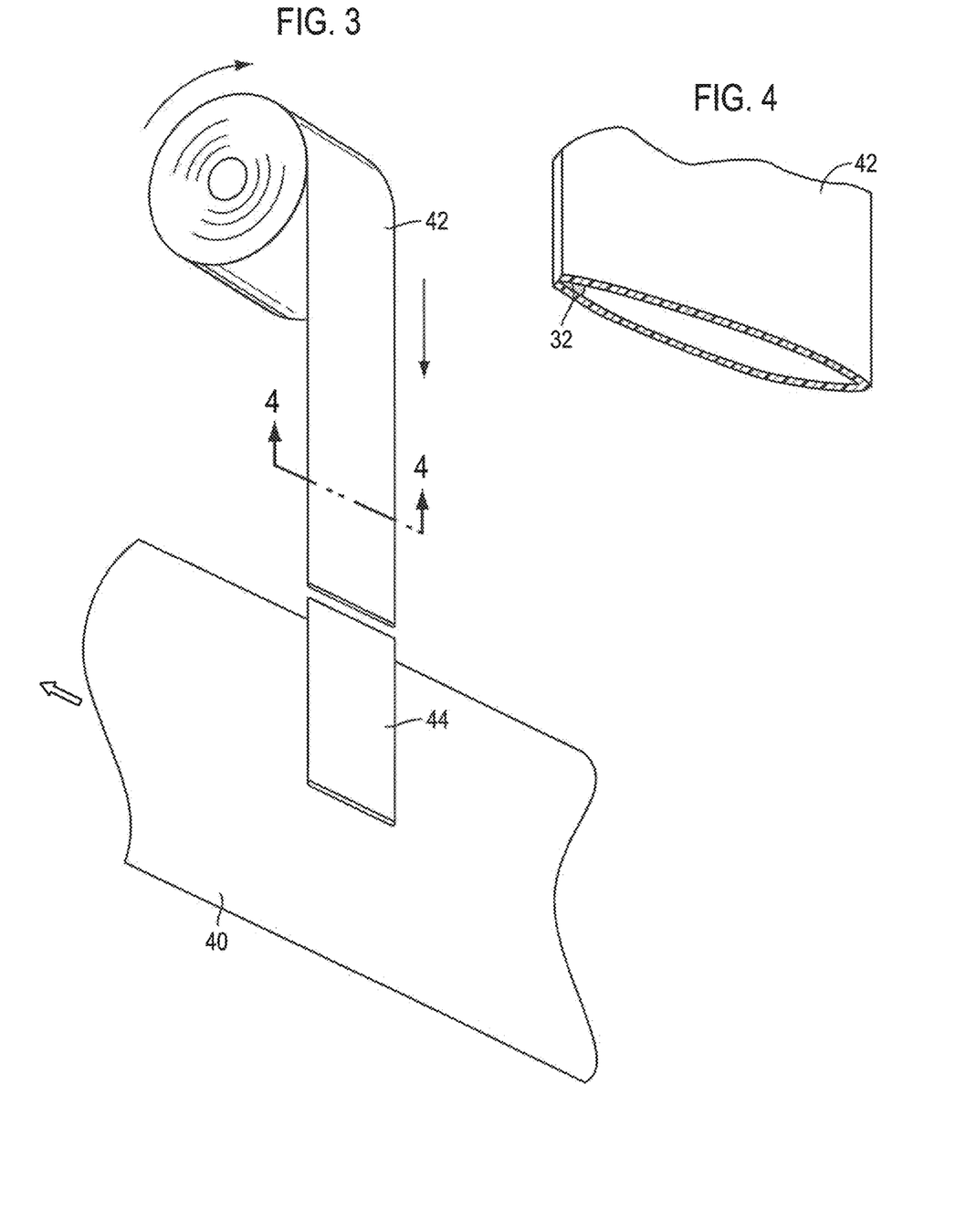
FIG. 3 is a diagrammatic view illustrating formation of a tubular sleeve of material for formation of bottom gusset in the package shown in FIGS. 1 and 2, in accordance with the present invention.
FIG. 4 is a cross-sectional view taken generally along lines 4-4 of FIG. 3.

As shown on FIG. 4, the sleeve-forming web 42 is folded to provide a tubular configuration, including a heat-sealed sleeve bond 32 joining lateral edges of the sleeve-forming web, as will be further described. Heat-sealed sleeve bond 32 is preferably formed substantially along the length of the folded web 42, spaced from and parallel to the folded edge of the web, with the sealant layer on an exterior of the tube, and the non-sealant layer on interior of the tube. While it is presently preferred that the heat-sealed bond 32 be substantially continuous, it is within the purview of the present invention to form heat-sealed bond 32 in a discontinuous configuration, such a comprising a plurality of spaced, cooperating individual seals.

As further illustrated, individual sleeves 44 are cut from the sleeve-forming web 42, and are positioned transversely of the longitudinal axis of the flexible web 40 from which the package body is formed. For some applications, it can be desirable to seal the ends of each individual sleeve 44, such as with suitable adhesive. The individual sleeves 44 are preferably joined by heat-sealing to the flexible web 40 in spaced apart relationship longitudinally of the web 40. The spacing between the individual sleeves 44 corresponds to the length of each of the bottom-gusseted packages 10 being formed.

After each of the individual sleeves 44 is joined to the flexible web 40 by heat-sealing, the flexible web is folded and the lateral margins thereof joined together to form a folded flexible web (see FIGS. 5 and 6). In this way, a package body is formed for each of the bottom-gusseted packages. By folding of the flexible web 40, the front and rear package panels 14 and 16 of each package are formed. The folded flexible web 40 can be joined to itself so as to form back seam 18, with the front and rear package panels joined to each other at the folded, lateral margins of the folded web. As illustrated, the individual sleeves 44 are positioned within the folded flexible web 40.

The present invention contemplates that each individual sleeve 44 is positioned to span and extend between two adjacent ones of the packages being formed, with subsequent cutting transversely of the longitudinal axis to form individual packages, including cutting through each sleeve portion 44 to form a bottom gusset 20 for one package, and a top sleeve portion 24 for an adjacent package. It is presently contemplated that formation in this manner can be effected, if desired, during packaging on a form, fill, and seal apparatus, or that individual packages can be formed for subsequent filling. Depending upon the specific formation technique, side seals 22 and 28 are typically formed prior to filling, with one of end seals 23, 25 formed after the contents of each package have been positioned therein. As will be appreciated, the heat-sealed bond 32 formed when sleeve-forming web 42 is formed into a tube will be included in the top sleeve portion 24.

In accordance with the present invention, a method of forming sleeves 44 for formation of gussets 20 in the packages 10 will now be described. The method includes providing the web 42 of polymeric material as a lamination of a non-sealant layer 43 and a sealant layer 45 having differing heat-sealing characteristics. Notably, in the preferred practice, this aspect of the present invention contemplates that attendant to formation of sleeves 44, the web 42 of sleeve-making material is folded, and then heat-sealed to form the heat-sealed bond 32 along one edge of each sleeve 44, opposite the folded edge thereof.

Notably, as will further described, the present method contemplates providing opposite lateral margins of the web 42 with sealable surface regions of the sealant layer 45. These sealable surface regions can be formed by select removal of portions of the non-sealant layer 43, or by configuring the outer sealant layer 45 to extend beyond opposite lateral margins of the inner, sealant layer 43. Thus, each sleeve 44 has an outer surface which is heat-sealable to the associated package-forming web 40, while the inner surface of each sleeve is not heat-sealed to permit the desired opening of each resultant gusset 20.

The folded sleeve-forming web 42 from which sleeves 44 are cut is formed from a polymeric web in the form of a lamination, such as a co-extrusion, of differing polymeric materials exhibiting differing heat-sealing characteristics. In particular, the web 42 can include an inner, non-sealant layer 43 such as polyethylene terephthalate (PET), and an outer sealant layer 45 such as comprising heat-sealable polyethylene (PE). The present method contemplates providing the sleeve-making web 42 of such polymeric material, and folding the web to position the non-sealant layer at an inside surface thereof to form a folded web.

Common laminate structures include PET/PE, PA/PA (polyamide/polyamide), as well as other polymeric compositions. Typically, these structures include a sealant layer that is bonded through a tie layer, usually adhesive, to a non-sealant layer. Ordinarily, the non-sealant layer, such as PET, is not heat sealable to itself. As a consequence, if a laminate web is folded in such a manner that the PE or sealant layers are opposing each other a heat-seal bond can be obtained. However, if the laminate is folded in such a manner that the PET or non-sealant/barrier layers oppose each other, a heat seal bond is not possible.

In this aspect of the present invention, the present invention contemplates use of a laser 48, as shown in FIG. 6. Although the use of a laser to form a bond between the different layers of material forming the gusset web has already been disclosed in the above-referenced US Patent Publication No. 2017/0057192, that method, utilizing a laser to melt the substrate layers together, has been found to suffer from the same bonding strength problems as stated earlier, since the melting of the two substrates that are radically different does not result in adequate bond strengths.

In the improved method, laser 48 is preferably used not to bond or melt the two layers together, but to vaporize the non-sealant layer 43, to thereby provide sealable surface regions so that the sealant layer 45 can be sealed directly to itself using more convention means, such as heat-sealing bars 50 (one being shown in FIG. 6). Alternative heat-sealing arrangements, such as a hot knife, or ultrasonic welder, can be employed. Notably, it has been determined that using the proper laser 48 with the appropriate settings, the non-sealant layer 43 can be vaporized without adversely affecting the sealant layer 45. This is possible since the sealant layer 45 presents very little resistance to the laser beam, while the typical non-sealant layer 43 creates enough resistance to generate enough heat to be vaporized. It has been shown that the non-sealant layer 43 can be vaporized, after the web 42 has been folded, using a single laser beam, which vaporizes the two non-sealant layers 43. Thus, the laser-light energy can be applied to the laminated web 42 such that the non-sealant layer 43 can be vaporized, without affecting the sealant layer 45, thus providing the desired sealable surface regions.

In this embodiment, the step of applying laser-light energy to the lateral margins of the polymeric web 42 is effected after the step of folding the web. Notably, this formation technique includes directing the laser-light energy through the sealant layer 45 to vaporize a double-thickness of non-sealant layer 43, thereby providing the sealable surface regions of the sealant layer. However, it will be appreciated that laser-light energy can be applied to web 42 prior to folding to effect the desired vaporization of select portions of the non-sealant layer 43, thereby providing the sealable surface regions of the sealant layer 45, as will be further described below.

It is further contemplated that a trim piece 47 of the folded gusset material be removed, such as by trim knife 49, so that the resultant sleeve seal 32 is small enough to be cut off when forming the package with a bottom gusset. The present method thus preferably includes cutting the tube from which the folded web is formed, after the heat-sealing step, to thereby trim a portion of folded web positioned laterally outwardly of the heat-sealed bond for the tube. This acts to eliminate excess material from the edge of the tube before it is used for formation of bottom gusseted packages. In a particularly preferred embodiment, the knife trim 49 comprises a cutting edge defining a single bevel surface on one side thereof, with the bevel surface being oriented toward the trim piece of the web 42. This preferred orientation has the desirable effect of pushing or diverting the trim piece 47 away from the tube being formed, while the edge of the sealed tube is not diverted away from the knife.

To facilitate high-speed formation, and to promote uniformity and stability of the folded, bonded web 42, cooling of the web can be effected in conjunction with the cutting and heat-sealing, such as by directing cooling air-flow against the web, and/or employing cooled or chilled plates or like surfaces for effecting web cooling. Providing cooling step in the region of the heat-sealing can be important in this process to keep the film cool, and also to cool the heat-sealed bond 32 immediately after forming. Cooling the heat-sealed bond has been found to allow a uniform, small weld bead. Without cooling the seal can become ragged on the edges, and excess heat in the area can also cause the film to wrinkle and deform from the heat.

Thus, the present invention thus contemplates a method for forming a tube of laminate material with a bonded or sealed edge. This is important for a product such as a bottom-gusseted package, as described above. This technique for formation of a bottom gusseted package requires that the inside layer of the gusset does not heat seal to itself, the gusset material yet must have a sealant layer to bond to the base film of the package to be formed. The bottom gussets are pre-applied to the base web and must remain intact on the web to allow winding into a roll and further processing on the form, fill, and seal machine. If the gussets are not closed into a tube, experience has shown that they may unfold on the rolls, or crash into the filling tube on the form, fill, and seal machine.

From the foregoing description, it will be appreciated that the method steps include:
1. Unwind roll of laminate film material 42;
2. Fold the film material 42 in half such that the barrier layers face each other on the inside of the web;
3. Run the edge through laser 49 to vaporize two layers of the non-sealant layer 43;
4. Feed the tube created to heat seal bars 50;
5. Trim the portion 47 of the folded web positioned laterally outwardly of heat-sealed bond 32 with trim knife 49; and leading edge to the base web of film;
6. Wind up the sealed tube 42 so that a roll is formed for later processing on FFS machine.

It is thus within the purview of the present invention to form the sealed tube 42, and thereafter wind the sealed tube onto a roll which can then later be used on an existing transverse direction applicator, without the need for adding heat sealing equipment to the applicator. In this way, a single tube-forming arrangement could then feed multiple applicators.

Typically, once the sleeve 44 is formed, it is applied transverse to the web 40 with a vacuum belt transfer to a heat seal bar. The sleeve 44 is then welded or heat-sealed to one side of the base web 40. Since the inner layer of the sleeve does not heat seal to itself, the heat-sealed bond 32 on the open edge prevents the otherwise folded gusset undesirably opening during package formation.

In accordance with the present invention, another improved method for forming a gusset material with improved bond strength is shown in FIGS. 11-14.

As in the previous embodiment, this method also utilizes two substrates laminated to each other, one substrate comprising a non-sealant layer 43 that will not easily seal to itself, and the other layer comprising a sealant layer 45 that will easily seal to itself. In distinction from the previous embodiment, wherein a gusset material that has two layers of the same width laminated together, this aspect of the invention contemplates that the two substrate layers 43, 45 are formed with the sealant 45 layer being wider than the other, non-sealant layer 43, thus providing the desired sealable surface regions of the sealant layer.

Figure 11:
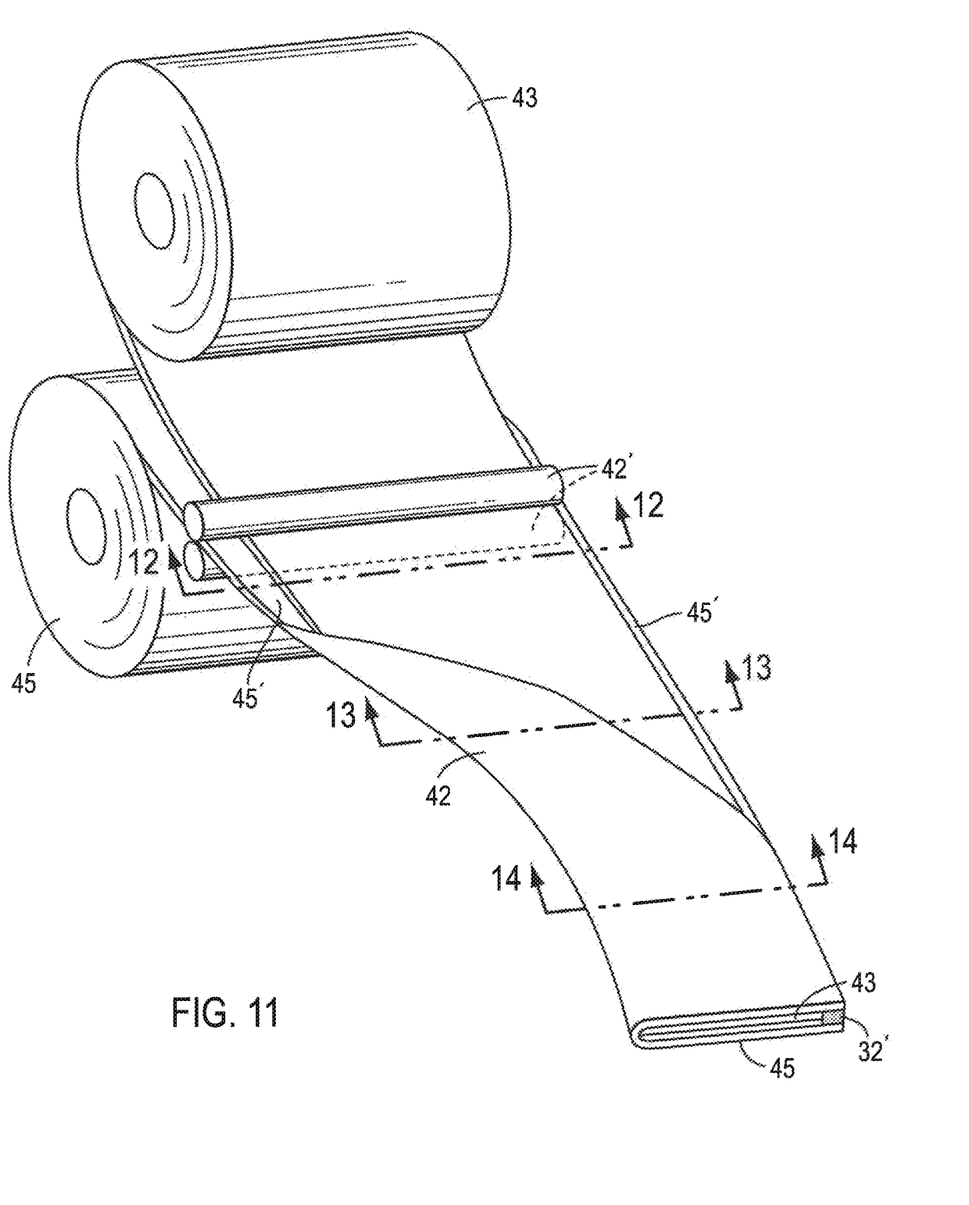
FIG. 11 is a diagrammatic view illustrating an alternative method of formation of a tubular sleeve in accordance with the present invention.
Figure 12:
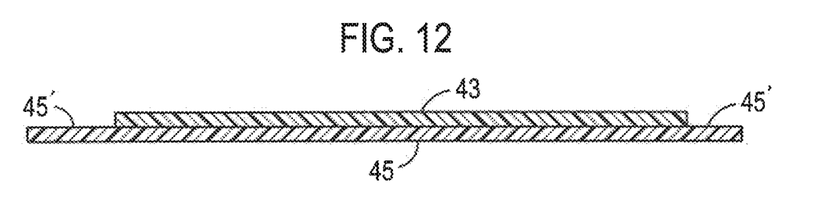
FIG. 12 is a cross-sectional view taken generally along lines 12-12 of FIG. 11.
Figure 13:
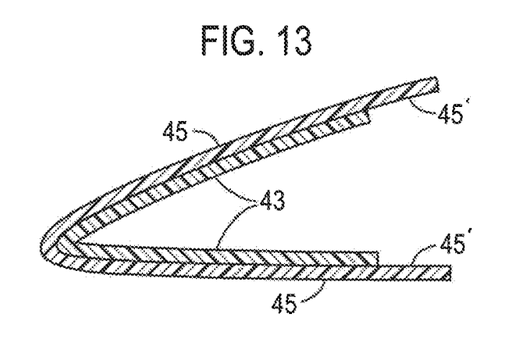
FIG. 13 is a cross-sectional view taken generally along lines 13-13 of FIG. 11.
Figure 14:
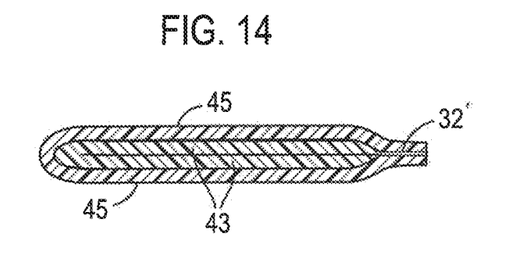
FIG. 14 is a cross-sectional view taken generally along lines 13-13 of FIG. 11.

FIG. 11 diagrammatically illustrates this method of forming bonded gusset material. Web 42 comprises a lamination of web layers, formed between suitable laminating rolls 42', with the wider web being the substrate sealant layer 45, and the narrower layer being the non-sealant layer 43. Thus, the sealant layer 45 extends beyond the non-sealant layer 43 at the opposite lateral margins of the web 42 to thereby provide sealable surface regions 45'.

Sealant layer 45 readily seals to itself at the opposite, exposed, sealable surface regions 45' thereof once the web 42 of gusset material is folded onto itself whereupon the sealable surface regions 45' are placed in direct facing relationship. Suitable heat-sealing arrangements, such as seal bars or the like (not shown), can be employed for efficiently forming a heat-sealed bond 32' where the sealant layer 54 can easily be sealed to itself along each edge of the folded web 42. This method desirably eliminates the need to remove a portion of the non-sealant layer (using a laser or other means) to allow for the sealing layers to be in contact with each other once folded so that they can easily be sealed together. Additionally, this formation technique can be practiced to eliminate the need to trim a portion of the folded web after heat-sealing of the regions 45' of the sealant layer 45.

Figure 15:
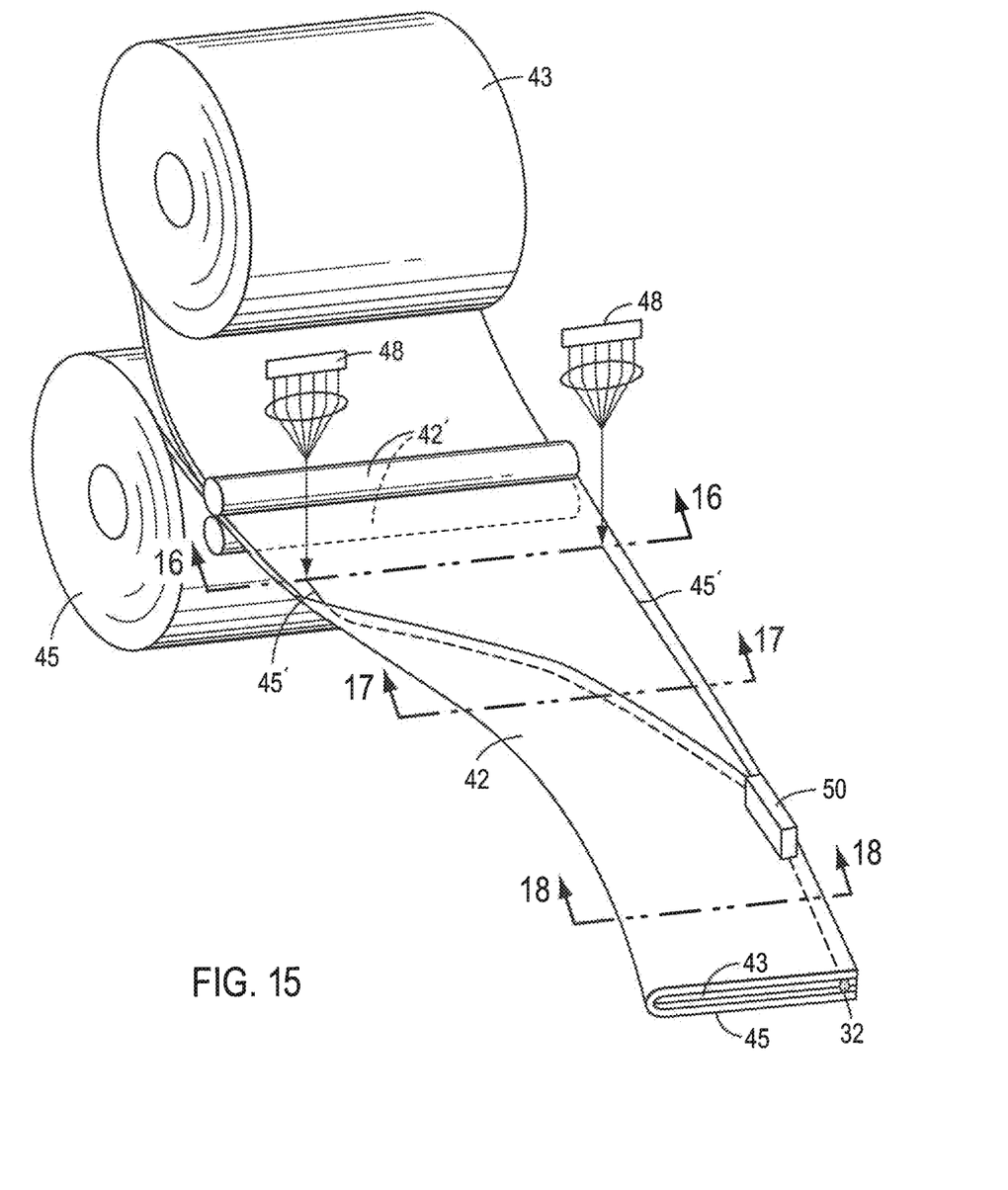
FIG. 15 is a diagrammatic view illustrating another alternative method of formation of a tubular sleeve in accordance with the present invention.
Figure 16:
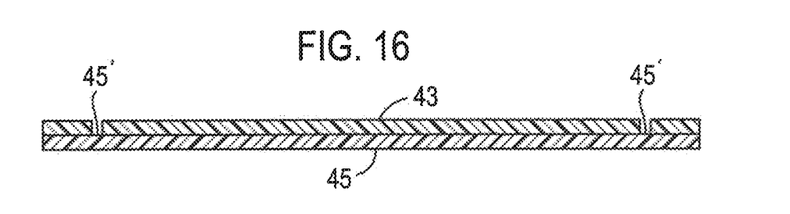
FIG. 16 is a cross-sectional view taken generally along lines 16-16 of FIG. 15.
Figure 17:
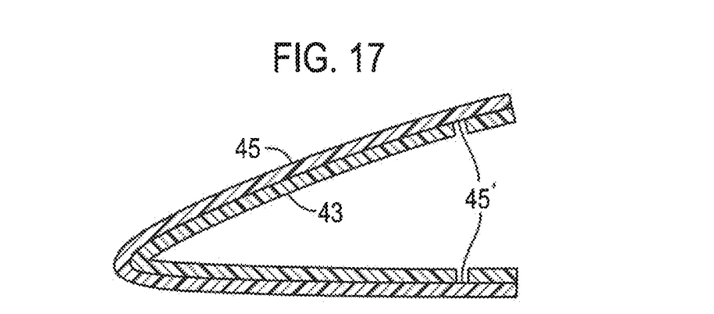
FIG. 17 is a cross-sectional view taken generally along lines 17-17 of FIG. 15.
Figure 18:
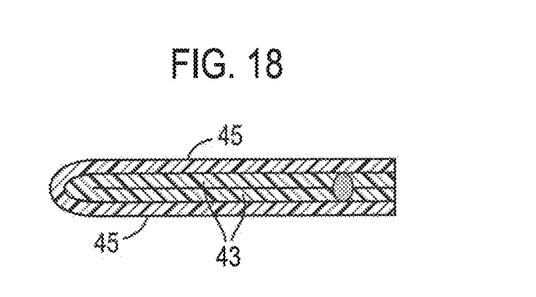
FIG. 18 is a cross-sectional view taken generally along lines 18-18 of FIG. 15.

FIG. 15 diagrammatically illustrates practice of the present invention, wherein laser-light energy is applied to the laminated polymeric web 42 prior to folding of the web. To this end, a pair of lasers 48 are provided for respectively vaporizing portions of the non-sealant layer 43 at respective opposite lateral margins of web 42. The pair of lasers 48 are positioned downstream of laminating rolls 42', and are operated to vaporize portions of the non-sealant layer 43 to thereby form the desired sealable surface regions 45'.

As illustrated, after vaporization of the non-sealant layer 43, the web 42 is folded to bring the sealable surface regions 45' into confronting relationship and contact with each other. Suitable heat-sealing bars 50 are provided for heat-sealing the web to itself at the sealable surface regions 45', thus forming heat-sealed bond 32. If desired, a suitable trim knife (not shown) can be provided for trimming and removing that portion of the folded web adjacent the heat-sealed bond 32. Since the portion of the folded web which includes heat-sealed bond 32 will eventually be positioned in the top portion of the package 10, as sleeve portion 24, it is desirable that the heat-sealed bond 32 be positioned as closely as possible to the edge of the sleeve-forming material.

Thus, the novelty of the current invention is to use a heat-sealing method to create a tube from a laminated material that contains a barrier layer that is not typically heat-sealable to itself. The present method has the added benefit of making an accurate tube which is dimensionally consistent. It is very common when folding web materials in flexible packaging that, in some cases, the folded edges overlap each other and do not line up perfectly all the time. It is therefore common in the industry to slit the edges with a razor blade so that the finished package has evenly aligned edges. In the present method of forming a tube, the process ensures that the edges are aligned because they are sealed together, and the finished size of the tube is not affected by misfolded edges which can be trimmed off and separated as scrap portion 43.

From the foregoing, it will be observed that numerous modifications and variations can be effected without departing from the true spirit and scope of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A method of forming a tube of polymeric material, comprising the steps of:
   providing a web of polymeric material comprising a lamination of a non-sealant layer and a sealant layer having differing heat-sealing characteristics, including providing opposite lateral margins of said web with sealable surface regions of said sealant layer;
   folding said web of polymeric material to position said non-sealant layer at an inside surface thereof to form a folded web and so that said sealable surface regions of said sealant layer are in facing relationship; and
   heat-sealing said folded web to form a tube, including applying heat to said folded web along a first lateral extent over a first part of which portions of said non-sealant layer are stacked directly against each other between the facing sealable surface regions of the sealant layer and over a second part of which said sealable surface regions of said sealant layer are in direct facing relationship to join said sealable surface regions of said sealant layer to provide a heat-sealed bond for said tube over the second part of the first lateral extent, without heat-sealing of said non-sealant layer to itself along the first part of said first lateral extent,
   wherein said sealable surface regions of said sealant layer over the second part of said first lateral extent are placed in direct facing relationship before heat-sealing said folded web to form said tube,
   wherein said sealable surface regions of said sealant layer over the second part of said first lateral extent are in direct contact with each other after heat-sealing said folded web to form said tube.

2. A method of forming a tube of polymeric material in accordance with claim 1, including
   cutting said tube after said heat-sealing step to trim a portion of said folded web positioned laterally outwardly of said heat-sealed bond for said tube.

3. A method of forming a tube of polymeric material in accordance with claim 1, wherein
   said step of providing opposite lateral margins of said web with sealable surface regions of said sealant layer includes removing at least a portion said non-sealant layer at each of said opposite lateral margins of said web.

4. A method of forming a tube of polymeric material in accordance with claim 3, wherein
   said removing step includes vaporizing said non-sealant layer.

5. A method of forming a tube of polymeric material in accordance with claim 4, wherein
   said vaporizing step includes applying laser-light energy to said non-sealant layer.

6. A method of forming a tube of polymeric material comprising the steps of:
   providing a web of polymeric material comprising a lamination of a non-sealant layer and a sealant layer having different heat-sealing characteristics, including providing opposite lateral margins of said web with sealable surface regions of said sealant layer;
   folding said web of polymeric material to position said non-sealant layer at an inside surface thereof to form a folded web and so that said sealable surface regions of said sealant layer are in direct facing relationship;
   heat-sealing said folded web to form a tube, including applying heat to said folded web to join said sealable surface regions of said sealant layer seals to provide a heat-sealed bond for said tube, without heat sealing of said non-sealant layer to itself,
   wherein said sealable surface regions of said sealant layer are placed in direct facing relationship before heat-sealing said folded web to form said tube,
   wherein said sealable surface regions of said sealant layer in direct facing relationship are in direct contact with each other after heat-sealing said folded web to form said tube, wherein said step of providing opposite lateral margins of said web with sealable surface regions of said sealant, layer includes removing at least a portion of said non-sealant layer at each of said opposite lateral margins of said web, wherein said removing step includes vaporizing said non-sealant layer, wherein said vaporizing step includes applying laser-light energy to said lateral margins, wherein said step of applying laser-light energy to said lateral margins is effected prior to said folding step by applying laser-light energy to opposite lateral margins of said polymeric web.

7. A method of forming a tube of polymeric material in accordance with claim 1, wherein
said step of providing opposite lateral margins of said web with sealable surface regions of said sealant layer includes forming said lamination so that said sealant layer extends beyond said non-sealant layer at said opposite lateral margins of said web.

8. A method of forming a tube of polymeric material in accordance with claim 1, wherein
said web of polymeric material comprises co-extrusion of said non-sealant and sealant layers.

9. A method in accordance with claim 1, including,
providing a flexible web of material having a longitudinal axis;

cutting said tube into a plurality of individual sleeves;

joining said individual sleeves to said flexible web in spaced apart relationship longitudinally of said flexible web, with the spacing between said individual sleeves corresponding to the length of each of a plurality of bottom-gusseted packages being formed;

folding said flexible web of material and joining the lateral margins thereof to form a folded flexible web, and to thereby form a package body for each of said bottom-gusseted packages;

each package body including a front package panel and a rear package panel joined at opposite side margins thereof, said individual sleeves being positioned generally within said folded flexible web; and cutting said folded flexible web at intervals each corresponding in length to said length of each of said bottom-gusseted packages so each individual sleeve provides a bottom gusset for one of the packages being formed.

10. The method of forming a tube of polymeric material in accordance with claim 1 wherein after heat-sealing said folded web, areas of said sealable surface regions in facing relationship remain unsealed on laterally opposite sides of said heat-sealed bond for said tube.

* * * * *